United States Patent
Cuomo

(10) Patent No.: US 7,219,663 B2
(45) Date of Patent: May 22, 2007

(54) KIT, APPARATUS AND METHOD FOR USE IN COOKING OVER AN INTENSE HEAT SOURCE

(75) Inventor: Robert Cuomo, Oconomowoc, WI (US)

(73) Assignee: Islander Innovations LLC, Wales, WI (US)

( * ) Notice: Subject to any disclaimer, the term of this patent is extended or adjusted under 35 U.S.C. 154(b) by 195 days.

(21) Appl. No.: 10/932,663

(22) Filed: Sep. 2, 2004

(65) Prior Publication Data

US 2005/0051157 A1    Mar. 10, 2005

Related U.S. Application Data

(60) Provisional application No. 60/500,465, filed on Sep. 5, 2003.

(51) Int. Cl.
*F24C 1/16*    (2006.01)
(52) U.S. Cl. .............. 126/25 R; 126/275 R; 126/9 R; 99/447
(58) Field of Classification Search .......... 126/27, 126/9 R, 9 B, 19 R, 273 R, 273.5, 274, 275 R, 126/275 E, 390, 215, 216, 214 D, 25 R; 99/447, 449, 450
See application file for complete search history.

(56) References Cited

U.S. PATENT DOCUMENTS

| | | | | |
|---|---|---|---|---|
| 167,237 A | * | 8/1875 | McDonald et al. ...... | 126/275 R |
| 187,013 A | * | 2/1877 | Jackson ............... | 126/273 R |
| 226,010 A | * | 3/1880 | Whitmore ............. | 126/45 |
| 257,018 A | * | 4/1882 | Kellett .............. | 126/275 R |
| 319,003 A | * | 6/1885 | Gates ................ | 126/275 R |
| 563,928 A | * | 7/1896 | Huenefeld ............ | 126/275 R |
| 1,698,914 A | * | 1/1929 | Kircher .............. | 126/377.1 |
| 2,582,735 A | * | 1/1952 | Alaj ................. | 126/246 |
| 3,786,741 A | | 1/1974 | Plumley et al. | |
| 3,799,048 A | | 3/1974 | Finley | |
| 4,498,376 A | | 2/1985 | Carey | |
| 4,729,297 A | * | 3/1988 | Iranzadi ............. | 99/401 |
| 4,906,806 A | * | 3/1990 | Levinson ............. | 219/731 |
| 5,315,922 A | * | 5/1994 | Keller ............... | 99/447 |
| 5,365,833 A | | 11/1994 | Chen | |
| 5,523,104 A | * | 6/1996 | Kirk ................. | 426/523 |
| 5,555,795 A | * | 9/1996 | Tsai ................. | 99/446 |
| 5,592,871 A | * | 1/1997 | Bartlett ............. | 99/400 |

(Continued)

*Primary Examiner*—Kenneth Rinehart
*Assistant Examiner*—Chuka C Ndubizu
(74) *Attorney, Agent, or Firm*—Carrier, Blackman & Associates, P.C.; William D. Blackman; Joseph P. Carrier

(57) ABSTRACT

A portable cooking kit, apparatus and method is usable for moderating heat from an intense heat source, such as an outdoor grill or 1. The apparatus includes a food support member, including a perforated panel surrounded by a rim. The food support member rests on top of a heat shield made from a heat-tolerant material. During use, the heat shield is stably suspended over direct, intense heat from a heat source. The food to be cooked is placed on the food support member, and the food support member may then be placed on top of the heat shield. By buffering the direct heat from the heat source, the heat shield allows food placed on the food support member to cook, but protects the underside of the food from becoming scorched. Optionally, a dome-shaped cover may be used to cover both the food support member and the heat shield.

17 Claims, 5 Drawing Sheets

U.S. PATENT DOCUMENTS

| | | | |
|---|---|---|---|
| 6,000,319 A * | 12/1999 | Treiber | 99/449 |
| 6,092,520 A | 7/2000 | Hasegawa | |
| 6,105,487 A * | 8/2000 | Nash et al. | 99/400 |
| 6,187,359 B1 | 2/2001 | Zuccarini | |
| 6,329,007 B1 * | 12/2001 | Khusro | 426/502 |
| 6,457,601 B1 | 10/2002 | Chappell | |
| 6,546,850 B1 | 4/2003 | Akiyama-Warren | |
| 6,622,616 B1 * | 9/2003 | Measom | 99/345 |
| 6,640,695 B2 | 11/2003 | Stark | |
| 6,782,801 B1 * | 8/2004 | Correa et al. | 99/340 |
| 7,021,202 B2 * | 4/2006 | Sizer | 99/415 |
| 2005/0039612 A1 | 2/2005 | Denny | |

* cited by examiner

KIT, APPARATUS AND METHOD FOR USE IN COOKING OVER AN INTENSE HEAT SOURCE

CROSS-REFERENCE TO RELATED APPLICATIONS

The present application claims filing date priority under 35 USC 119 based on U.S. provisional application Ser. No. 60/500,465, filed Sep. 5, 2003. The entire disclosure of U.S. provisional application Ser. No. 60/500,465 is incorporated herein by reference.

BACKGROUND OF THE INVENTION

1. Field of the Invention

The present invention relates to a portable outdoor cooking kit, apparatus and method, for cooking food thereon over an intense heat source. More particularly, the present invention relates to a portable outdoor cooking kit, apparatus and method configured to cook scorchable food, such as pizza, over an intense heat source, such as a campfire or barbecue grill, while moderating heat applied to the food from the heat source.

2. Description of the Background Art

Barbeque grills are popular for cooking foods because of the ease of using this cooking method, because of the party atmosphere associated with outdoor cooking, and because of the unique flavor of food cooked by this method. In addition, outdoor cooking is an enjoyable endeavor due to the pleasant surroundings, and is preferable in the hot summer months so as to minimize unnecessary additional heating of the interior of the home while preparing food.

However, some foods, such as pizza, fish, and some vegetables, are not easily cooked on a barbeque grill. Pizza, in particular, is a popular food that, is not generally suited for cooking outdoors on a grill rack or open flame. Pizza also requires a uniformly high-temperature environment and even heat distribution, in order to cook properly. This uniformly heated environment is not provided by the concentrated heat source found within a campfire or barbeque grill.

Thus, there are certain foods which are not generally suited for placement directly above an intense heat source, and which require a uniform, moderate-temperature cooking environment, if they are to be cooked over an intense heat source without scorching.

Cooking pans referred to as "double boilers" have long been used on the stove top, with water in the lower container, to provide gentle heating for sauces and the like.

The background art contains a broad variety of portable cooking utensils and devices intended for use with a barbeque grill, and which attempt to accommodate the requirements of flat foods, like pizza. A limited number of these known devices are specifically designed for cooking pizza on a barbeque grill or the like.

One such patent is U.S. Pat. No. 6,640,695 issued to Stark, which discloses a tile supported over a grill using a rack. While the apparatus of Stark spaces the main cooking tile up and away from the grill rack on which the apparatus is supported, the device of Stark does not include a heat shield which is situated below and spaced away from the main cooking plane.

U.S. Pat. No. 6,187,359 issued to Zuccarini, and U.S. Pat. No. 3,786,741 issued to Plumley et al., respectively, each disclose a perforated pan which is constructed to rest directly on the grill grate. These devices have no means to substantially prevent scorching of the underside of the food associated with the grills' localized, intense heat source.

U.S. Pat. No. 5,365,833 issued to Chen, discloses a pizza baking pan that includes a modified wok with a central hole formed therein, and a ceramic plate supported above the modified wok.

U.S. Pat. No. 4,498,276 issued to Carey discloses a cover for cooking pizza on a flat grill plate or griddle, as found in a fast food restaurant, and does not address the issue of cooking upon a grill rack, grate, or open flame.

Other patents relating generally to double-walled cooking pans or dishes include U.S. Pat. No. 1,698,914 to Kircher, U.S. Pat. No. 3,799,048 to Finley, U.S. Pat. No. 6,092,520 to Hasegawa, U.S. Pat. No. 6,457,601 to Chappell, and U.S. Pat. No. 6,546,850 to Akiyama-Warren.

While the known devices are useful for their intended purposes, a need still exists for an improved kit, method and apparatus that would enable a user to cook foods on a barbeque grill or other intense heat source, while moderating the relatively intense heat thereof. In particular, a cooking kit is needed for use with an intense heat source, in which the kit includes a heat shield for placement below and spaced away from the main cooking panel, for 'buffering' or moderating the intense heat of the heat source.

SUMMARY OF THE INVENTION

The present invention provides an improved portable outdoor cooking kit, apparatus and method that allows pizza to be cooked over an intense heat source, such as a campfire or outdoor barbeque grill. The inventive apparatus includes a food support member having a plurality of openings formed therethrough, and a heat shield for placement below and spaced away from the food support member. Optionally, the apparatus may also include a domed cover.

In use, the heat shield is stably supported over a heat source, such as by placement upon a grill rack of a barbeque grill. The food support member is then placed over the heat shield, and the uncooked food is placed on an upper surface of the food support member. The heat from the heat source is then directed around, toward, and upon the food support member. The heat shield moderates the heat being transferred therethrough and to the food, and also helps distribute the heat in a relatively uniform pattern.

The presence of the heat shield in the kit hereof allows food placed on the food support member to cook more slowly and evenly than it would without the presence of the heat shield. Furthermore, the heat shield redirects some of the heat from the heat source from below the food support member, allowing even and thorough cooking of the food, and reducing the possibility that the underside of the food will become scorched.

In a first embodiment of the present invention, the heat shield includes two thin, parallel plates that are joined by connectors, and fixed together in a vertically spaced relationship. Also in this first embodiment, the upper plate of the heat shield may be provided with plural support arms attached to an upper surface thereof and extending upwardly thereon. Where used, these support arms are used to receive and support the food support member above the heat shield in an overlying, spaced relationship.

In an alternate arrangement, the support arms may be provided attached to and extending downwardly from the lower surface of the food support member, and suitable corresponding structure may be provided on the heat shield to receive the support arms.

When the optional domed cover is used, the cover is adapted to be placed over both the heat shield and food support member. The domed cover is formed with a diameter greater than that of either the heat shield or the food support member, and as a result, the domed cover is able to receive heat flowing upward around the periphery of the heat shield and the food support member, and to direct the heat around, above, and toward the cooking food.

In another embodiment of the present invention, the underside of the food support member rests directly on the upper surface of the heat shield.

In yet another embodiment of the present invention, the underside of the food support member is provided with a plurality of equally spaced legs, and the upper side of the food support member is provided with handles. In this embodiment, the legs of the food support member are supported by the heat shield so that the food support member and heat shield are vertically spaced apart from each other.

Where the optional domed lit is used as part of the apparatus, a uniform, high temperature is 1 within the interior of the domed cover, allowing for substantially even cooking of the food placed therein.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

First Embodiment-Overview

Figure 1:
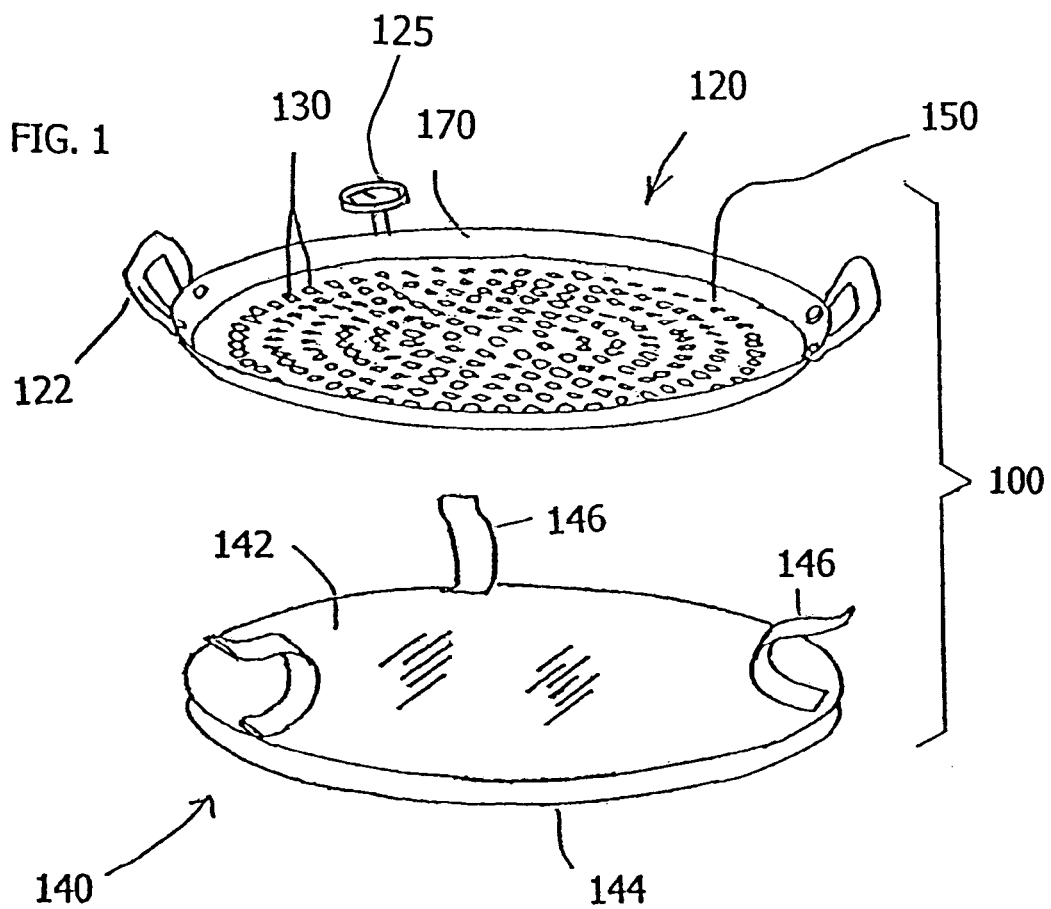
FIG. 1 is an exploded perspective view of a heat-moderating cooking kit and apparatus according to a first embodiment of the present invention, illustrating the nested relationship between the heat shield and the food support member.

Referring now to the figures, and especially to FIGS. 1-2, a cooking kit, apparatus and method according to a first embodiment of the present invention will now be described. The inventive cooking apparatus 100 hereof is well suited for use on an outdoor heat source which provides relatively intense heat, such as a campfire or a barbecue grill. Where a barbeque grill is used as the heat source, the grill may be gas-fired, or may use conventional charcoal.

The cooking kit, apparatus and method hereof is especially well suited for cooking pizzas, either fresh homemade or frozen store-bought, using a barbecue grill. However, the present invention is not limited to the cooking of pizzas, since many different foods, including meat, fish and vegetables, may be cooked using the kit and apparatus according to the present invention. Additionally, the cooking apparatus 100 is not limited to use on a barbeque grill, but may be used to cook food using nearly any heat source in which intense heat is provided beneath the cooking area.

The cooking apparatus 100 may also be viewed as a kit, since it includes component parts which are used together, but which are not necessarily required to be physically connected or attached to one another.

In a first embodiment of the invention, shown in FIGS. 1-2, the cooking apparatus 100 includes a food support member 120 for supporting food to be cooked thereon, and a heat shield 140, adapted for supporting placement below the food support member 120 during use.

The Heat Shield

The heat shield 140 of the first embodiment is formed with two thin, flat baffle plates 142, 144 fixed together in a spaced apart, vertically stacked relationship. The two baffle plates 142, 144 are joined together with a plurality of baffle spacers 148 (FIG. 2) extending therebetween, and defining a buffer zone between the plates. As seen in FIGS. 1 and 2, in this embodiment, an open space is provided between peripheral edge portions of the baffle plates 142, 144, at an outer edge of the heat shield 140, such that heated air from the buffer zone may flow outwardly through the open space.

The baffle spacers 148 are provided extending between the upper and lower baffle plates 142, 144 of the heat shield 140, and are welded thereto to fixedly interconnect the baffle plates. At least three baffle spacers 148 are used to space the upper baffle plate 142 away from the lower baffle plate 144. In the depicted embodiment, the baffle spacers 148 are substantially U-shaped, with the open part of the U facing outwardly, and are situated adjacent the respective peripheral edges of the baffle plates 142, 144.

The peripheral geometry of the heat shield 140 is similar to that of the food support member 120. In the depicted embodiment, the heat shield 140 has a circular outline shape. It will be understood that alternative shapes such as oval, square, rectangular or any other selected geometric shape could be used instead of the round shape shown.

During use, the heat shield 140 deflects some heat from the heat source away from the underside of the food support member 120, so as to prevent scorching of food being cooked thereon. Because the heat shield 140 is intended for placement close to the heat source, and is directly contacted by heat from the intense heat source during use, the heat shield 140 is fabricated from a heat-tolerant material, which may be metal. The heat shield 140 may be formed of any suitable heat-tolerant metal. Ferrous metals such as iron and steel are usable to form the heat shield 140. Where the heat shield 140 is made of metal, it allows some heat to diffuse upwardly therethrough, thereby facilitating the cooking of food on the food support member 120.

Alternatively, the heat shield 140 may include a metal frame extending peripherally therearound, and may have one or more stone sections or ceramic tiles (not shown) embedded within the frame.

Figure 2:
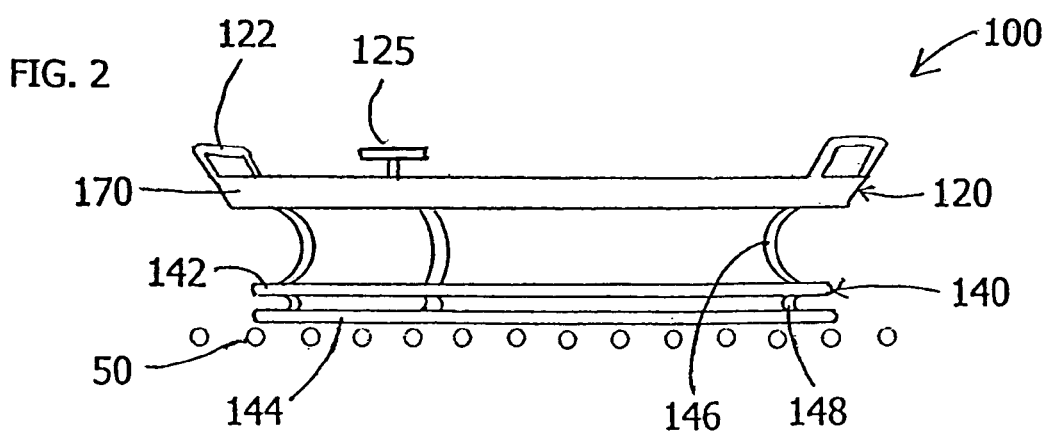
FIG. 2 is a side plan view of the kit and apparatus according to the first embodiment of the invention shown in use on a barbeque grill rack, illustrating the parallel-plate construction of the heat shield, and illustrating the food support member supported above the heat shield by the generally U-shaped support arms.

Another feature of the apparatus 100 according to the first embodiment, depicted in FIGS. 1-2, is that in this embodiment, at least three upwardly extending support arms 146 are affixed to the top of the heat shield's upper baffle plate 142. The support arms 146 are approximately equally spaced around the upper baffle plate 142, adjacent the peripheral edge thereof.

In the embodiment of FIGS. 1-2, the support arms 146 are substantially U-shaped, and are oriented such that the opening of the U faces outwardly toward the peripheral edge of the upper plate 142. The vertical height of the support arms 146 determines the height at which the food support member 120 will be placed. A first portion of each U-shaped support arm is fixed, such as by welding, to the top surface of the upper plate 142, and the opposing portion is used as a resting support surface, to support the food support member 120 thereon. The support arms 146 cooperate to form a cradle for supporting the food support member 120 above the heat shield 140.

The Food Support Member

In the embodiment of FIGS. 1-2, the food support member 120 includes a perforated plate, or main panel 150, that is completely surrounded by an integrally formed rim 170. The rim 170 extends upwardly and outwardly from the outer peripheral edge of the main panel 150. The rim 170 prevents food from unintentionally dropping off the edge of the main panel 150.

The food support member 120 may, optionally, have a thermometer 125 attached thereto, as shown. Alternatively, a thermometer 125 may be attached to the heat shield 140.

The peripheral outline shape of the food support member 120 is similar to that of the heat shield 140. The main panel 150 may have a circular outline shape, as shown. The main panel 150 is provided with a plurality of perforations 130 that extend therethrough between the respective upper and lower surfaces thereof, allowing heated air to flow through the main panel 150, when in use, to heat the underside of food residing thereon. The main panel 150 of the food support member 120 may be made of metal, and/or may include a durable ceramic material. The food support member 120 may, optionally, be partially or completely coated with a non-stick material, in order to make it easy to clean. Alternatively, the food support member 120 may have a metal core with an enamel overlay.

Also in the embodiment of FIGS. 1-2, at least two handles 122 are provided attached to the rim 170 of the food support member 120. The handles 122 extend upwardly and outwardly from the upper edge of the rim 170, to allow ease of handling of the food support member. In particular, when using the kit 100 according to the present invention, when cooking is completed, since the food support member 120 is made separate and detachable from the heat shield 140, the food support member 120 can be removed from the heat shield 140 using the handles 122, and the heat shield 140 can remain on the heat source until cool.

Method of Using the Apparatus

In use, the heat shield 140 is placed directly onto, and is supported by, any suitable support structure situated above the heat source. In the first embodiment, when used with a barbeque grill, the lower baffle plate 144 of the heat shield 140 may rest on a grill rack 50 of a barbeque grill, as shown in FIG. 2.

Alternatively, where used to cook over a campfire, the heat shield 140 may be placed resting on appropriately arranged rocks or logs (not shown).

Once the heat shield 140 is stably supported above a selected heat source, food to be cooked is placed on top of the food support member 120, which may, initially, be located in a different area from the heat shield, such as in a food preparation area. The food support member 120, with the food thereon, is then placed on top of the heat shield 140, such that the upper portions of the support arms 146 support the underside of the food support member 120, and such that the food support member 120 overlies the heat shield 140 in a spaced-apart relationship, as shown in FIG. 2.

Since the food support member is supported by the support arms 146 and in the first embodiment, as opposed to being fixed to the support arms 146, the food support member 120 can be easily removed from the apparatus, as needed.

In an alternate arrangement, if a one-piece apparatus is preferred for a particular application, an integral apparatus may be made by attaching the food support member 120 to the support arms 146 of the heat shield 140. Where the two components 120, 140 are attached together, it will be understood that the entire apparatus must be moved as a unit, and when the unit is hot, it should not be set directly on a 1 which could be damaged by heat.

In this first embodiment, the spacing between the upper and lower baffle plates 142, 144, respectively, of the heat shield 140 is relatively small, when compared to the spacing between the upper baffle plate 142 of the heat shield 140 and the main panel 150 of the food support member 120.

In one exemplary embodiment of the apparatus 100, the spacing between the upper and lower baffle plates 142, 144, respectively, of the heat shield 140 is approximately 1 cm, and the spacing between the upper baffle plate 142 of the heat shield and the main panel 150 of the food support member 120 is approximately 4 cm. Thus, in this embodiment, the distance between the upper baffle plate 142 and the food support member, when supported on the heat shield, is more than twice the distance between the upper and lower baffle plates 142, 144. These dimensions are not intended to be limiting, but instead are provided as an illustration of the general scale of a representative embodiment of the invention.

Alternative Embodiments

Figure 3:
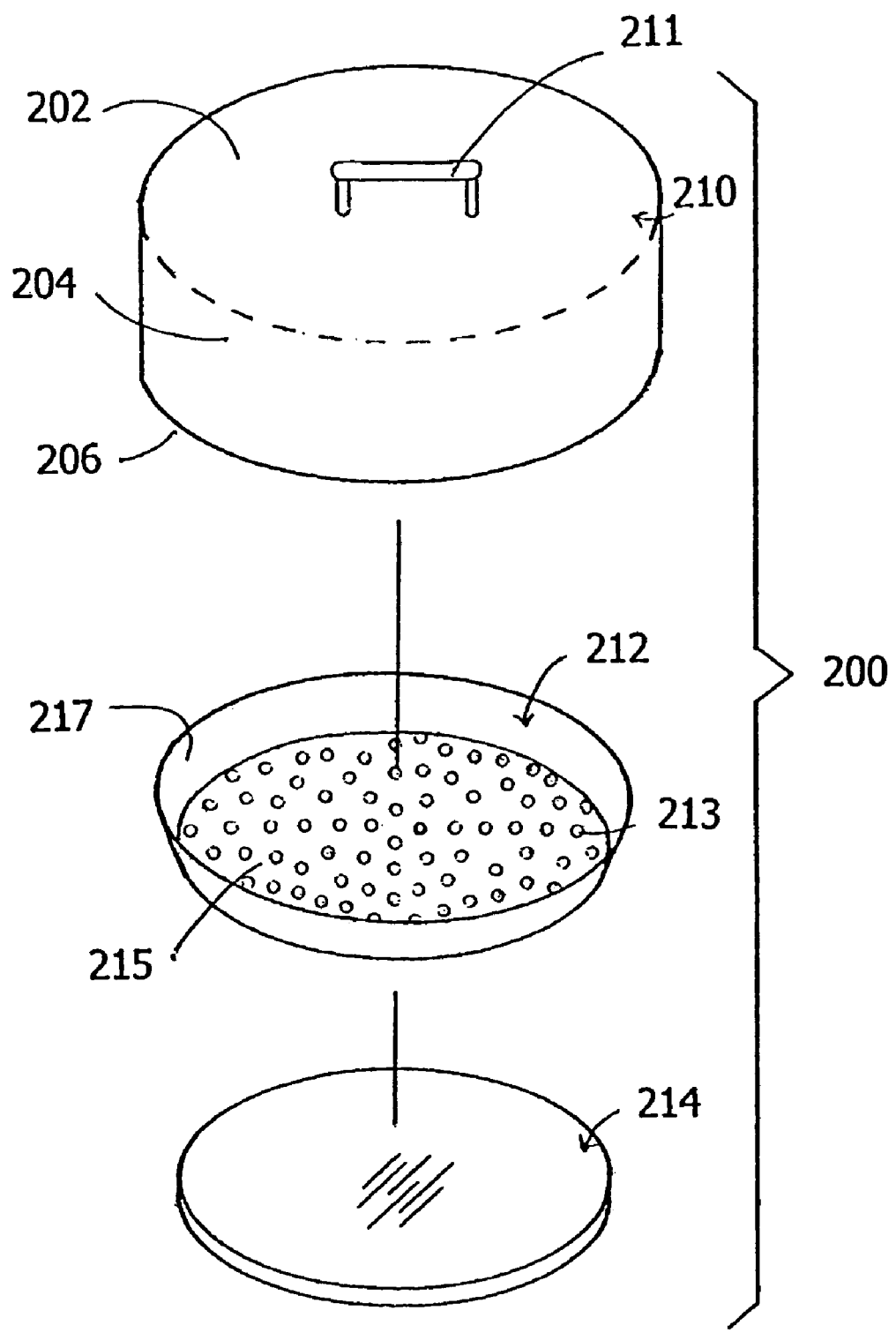
FIG. 3 is an exploded perspective view of a cooking kit and apparatus according to a second embodiment of the invention, including a heat shield, a food support member and a domed cover.
Figure 4:
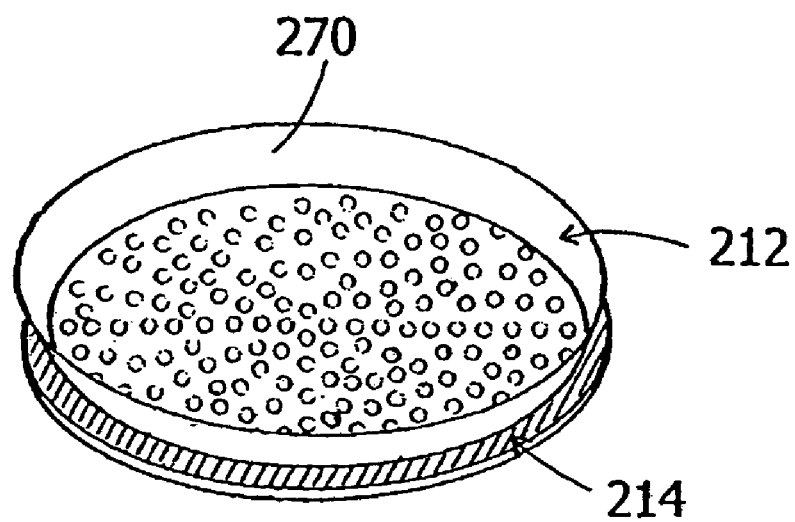
FIG. 4 is a top perspective view of the heat shield and food support member of the cooking kit and apparatus according to the second embodiment of the invention, with the domed cover omitted from the drawing for purposes of illustration.
Figure 5:
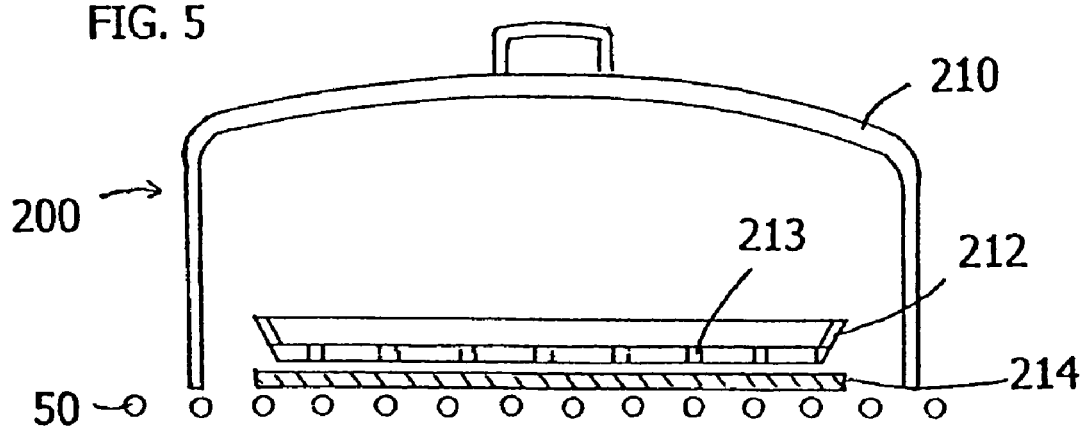
FIG. 5 is a side sectional view of the heat-moderating cooking kit according to the second embodiment of the invention in use on a grill rack, illustrating the domed cover overlying and surrounding the food support member and the heat shield, and the lower edges of the domed cover resting on the grill rack.

Referring now to FIGS. 3-5, a second embodiment of a kit and apparatus for cooking over an intense heat source, according to the present invention, is shown generally at 200. In this second embodiment, the kit 200 includes a domed cover 210, a food support member 212, and a heat shield 214. The primary materials for the cover 210, food support member 212, and heat shield 214 are metals, although durable ceramics are also usable for some components or subcomponents thereof. The food support member 212 may have a non-stick coating thereon.

The Cover

The cover 210 is formed in a generally dome-like shape, including side walls 204, a closed top 202, and an open lower end 206. The exterior of the closed top 202 is provided with a handle 211, which is formed from a heat-tolerant material with some insulating properties, such as a suitable heat-tolerant plastic, or metal encased in a heat-tolerant plastic. The closed top 202 is provided with a downward-facing concavity, to promote heat flow from the side walls 204 of the dome to the center of the dome.

The side walls 204 of the cover 210 may form any closed shape, and may be circular in horizontal section, as shown. The side walls 204 have a height that is greater than the combined, or stacked, height of the food support member 212 and the heat shield 214. The side walls 204 of the cover 210 have a diameter that is greater that the diameter of either the food support member 212 or the heat shield 214, so that the cover 210 can completely cover and enclose these other components of the apparatus 200. Where used, the cover 210 may be provided with an adjustable air vent, similar to that used with a conventional barbeque grill cover.

Figure 6:
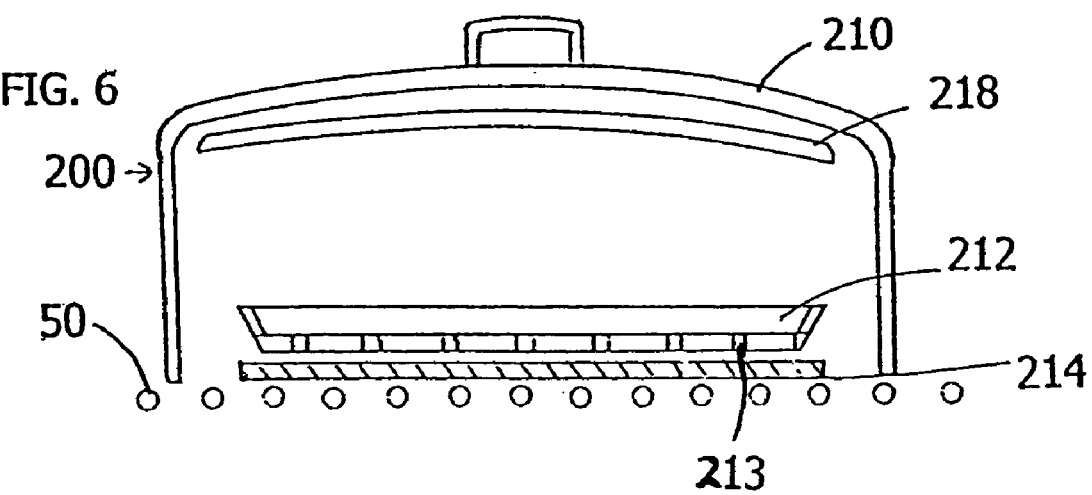
FIG. 6 is a side sectional view of a modified version of the heat-moderating cooking kit according to the second embodiment of the invention in use on a grill rack, similar to FIG. 4, illustrating the domed cover with a heat-reflective panel disposed on an inner surface thereof.

A heat-reflective panel 218 may, optionally, be provided within the domed cover 210 adjacent the closed top 202 (FIG. 6), to further promote heating of food placed within the apparatus. Where used, the panel 218 is secured to an interior surface of the top 202 by rivets, threaded fasteners or other conventional connectors, and is contoured and configured to generally cover part of the interior surface of the top portion 202 of the domed cover 210. Where used, the panel 218 may be formed out of a polished aluminum or stainless steel sheet, or from any other suitable heat-tolerant and heat-reflective material.

The Heat Shield

The heat shield 214 is a heat-tolerant plate that is adapted to rest above the heat source. The heat shield 214 may include upper and lower baffle plates similar to those described in connection with the first embodiment, or may be a solid member, formed from metals, ceramics, and/or stone.

The peripheral shape of the heat shield 214 is similar to that of the food support member 212. The heat shield 214 may have a circular outline shape, as shown. Because the heat shield 214 is left in close contact with the heat source for extending periods of time during use, and is used to deflect some of the direct heat away from the food support member 212, the heat shield is fabricated from a heat-tolerant material.

In one exemplary embodiment, the heat shield 214 may include a plate or tile formed from a refractory material such as stone or ceramic. However, the heat shield 214 may be formed of any suitable heat-tolerant material, including, but not limited to, metals and metal alloys.

The Food Support Member

In this second embodiment of the apparatus 200, the food support member 212 includes a perforated main panel 215 that is surrounded by a rim 217. The rim 217 prevents the food from unintentionally dropping off the edge of the main panel 215. The rim 217 extends upwardly and outwardly from the peripheral edge of the main panel 215, and the upward and outward shape promotes heat flow to the surface of the main panel 215, and thus to any food that resides thereon. The food support member 212 may be coated with a non-stick coating, so that food can easily be removed therefrom, and in order to be easy to clean.

The peripheral geometry of the main panel 215 of the food support member 212 is similar to that of the heat shield 214. The main panel 215 may have a circular outline shape, as shown. The main panel 215 is provided with a plurality of perforations 213 formed therethrough, allowing heated air to flow through the main panel 215, and to the underside of the food that resides thereon, when in use.

The domed cover 210 and the food support member 212 are each respectively fabricated from one or more heat-resistant materials. In one usable embodiment, these components are formed of materials including metals or metal alloys, including but not limited to steel, aluminum, copper, or the like. However, it is well within the scope of this invention to use alternate or additional suitable materials, such as stone pieces or high-temperature ceramics, to form these components.

Using the Apparatus

In use, the heat shield 214 is placed directly on a support member so as to be stably situated above the heat source. In one application, the heat shield 214 may be placed on a grill rack 50 within a barbeque grill. However, the cooking apparatus 200 is not limited to use on a barbeque grill, but instead may be used to cook food using nearly any heat source, especially those sources wherein an intense heat source is provided beneath the cooking area. For example, the heat shield may be suspended over the open flame of a campfire, or where suitable ventilation is available, the burner from a conventional stove top may be used as a heat source.

During use, the food support member 212 is placed on top of the heat shield 214, such that the underside of the main panel 215 rests upon and confronts the upper surface of the heat shield 214 in a stacked relationship (FIG. 5). The domed cover 210 is then placed over both the food support member 212 and the heat shield 214. Because the side walls 204 of the domed cover 210 have a diameter that is greater that the diameter of either of the food support member 212 or the heat shield 214, the domed cover 210 overlies and surrounds both the heat shield 214 and the food support member 212.

In this configuration, the food support member 212 and the heat shield 214 reside completely within the periphery of the domed cover 210, and the food support member 212 and the heat shield 214 are spaced apart from the side walls 204 of the domed cover 210. Thus, heat can flow upward into the domed cover 210 around the peripheral edges of both the food support member 212 and the heat shield 214, and be directed around and upon the food by domed cover 210, allowing the food to be cooked evenly throughout.

Third Embodiment

In an apparatus according to a third embodiment of the cooking apparatus (shown in FIGS. 7 and 8), the appratus 300 includes a heat shield 314 and a food support member 312 which is adapted to rest on top of the heat shield 314. The heat shield 314 may include upper and lower baffle plates similar to those described in connection with the first embodiment, or may be a solid member, formed from metals, ceramics, and/or stone.

Figure 8:
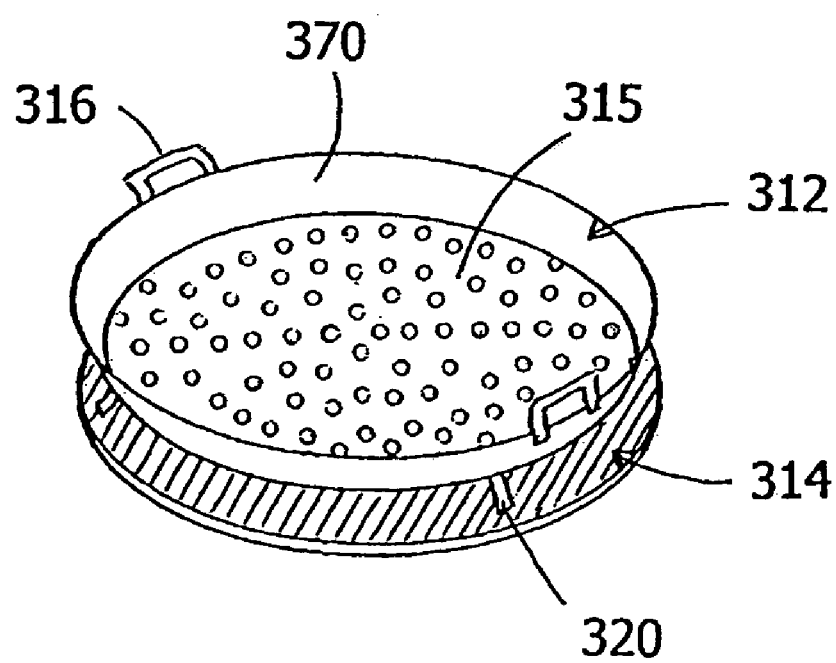
FIG. 8 is an upper perspective view of the heat-moderating cooking kit according to the third embodiment thereof, with the domed cover omitted from the drawing for purposes of illustration.
Figure 7:
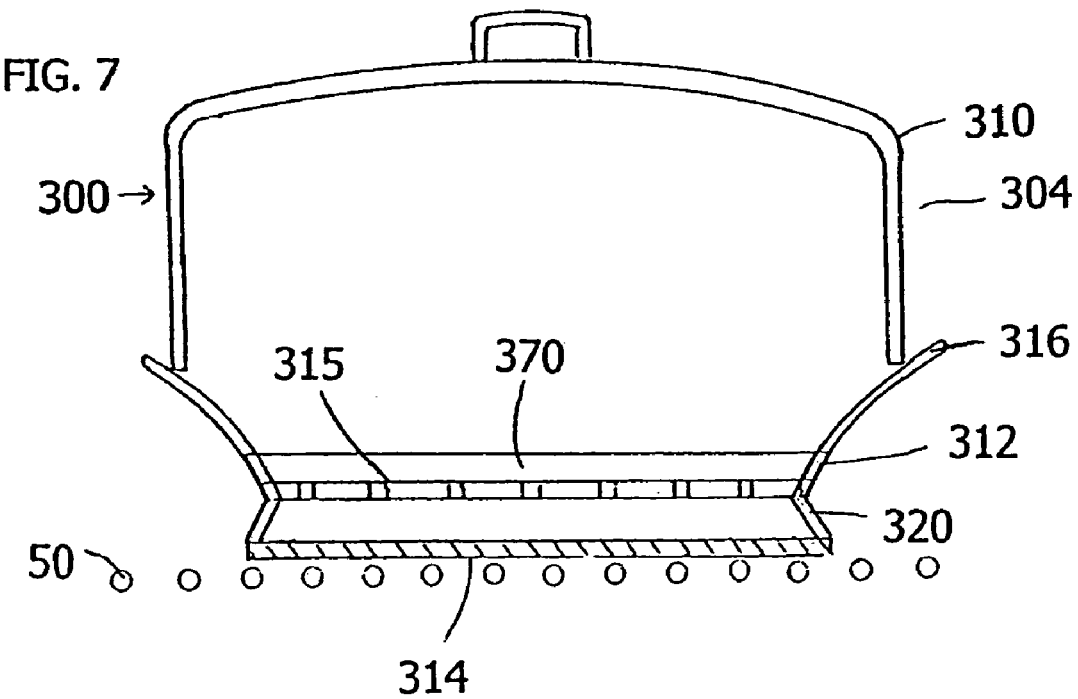
FIG. 7 is a side sectional view of a heat-moderating cooking kit according to a third embodiment of the invention in use on a grill rack, illustrating the dome overlying the food support member and the heat shield, and the lower edges of the dome being supported above the food support member by the handles of the food support member.

The food support member 312 of the third embodiment is provided with a plurality of support legs 320 extending downwardly thereon. Specifically, the lower surface of the main panel 315 is provided with at least three legs 320 extending downward from the underside, along the periphery thereof. The legs 320 support the food support member 312 such that the main panel 315 is spaced apart from the support surface on which it resides. In the embodiment of FIGS. 7 and 8, the food support member 312 is also provided with a pair of opposed handles 316 extending outwardly thereon.

During cooking, the food support member 312 overlies and is supported by the heat shield 314. During food service or storage, the food support member 312 may instead be supported by, for example, a table top or protective table cover (not shown).

Fourth Embodiment

In a fourth embodiment of the invention, shown in FIG. 9, another cooking apparatus 400 constructed in accordance with the present invention includes a food support member 420 for supporting food to be cooked thereon, and a heat shield 440, adapted for supporting placement below the food support member 420 during use.

The Heat Shield

The heat shield 440 of the fourth embodiment is formed with two thin, flat baffle plates 442, 444 fixed together in a spaced apart, vertically stacked relationship. The two baffle plates 442, 444 are joined together with a plurality of baffle spacers similar to those shown at 148 (FIG. 2) extending therebetween.

The heat shield 440 in the fourth embodiment is substantially similar to the heat shield 140 of the first embodiment as described herein, except that in the fourth embodiment, there are no support arms provided on the upper surface of the upper baffle plate 444. Instead, in this embodiment, the food support member 420 is provided with support legs 421 attached to and extending downwardly thereon, to space the food support member 420 upwardly away from the heat shield 440.

The Food Support Member

Figure 9:
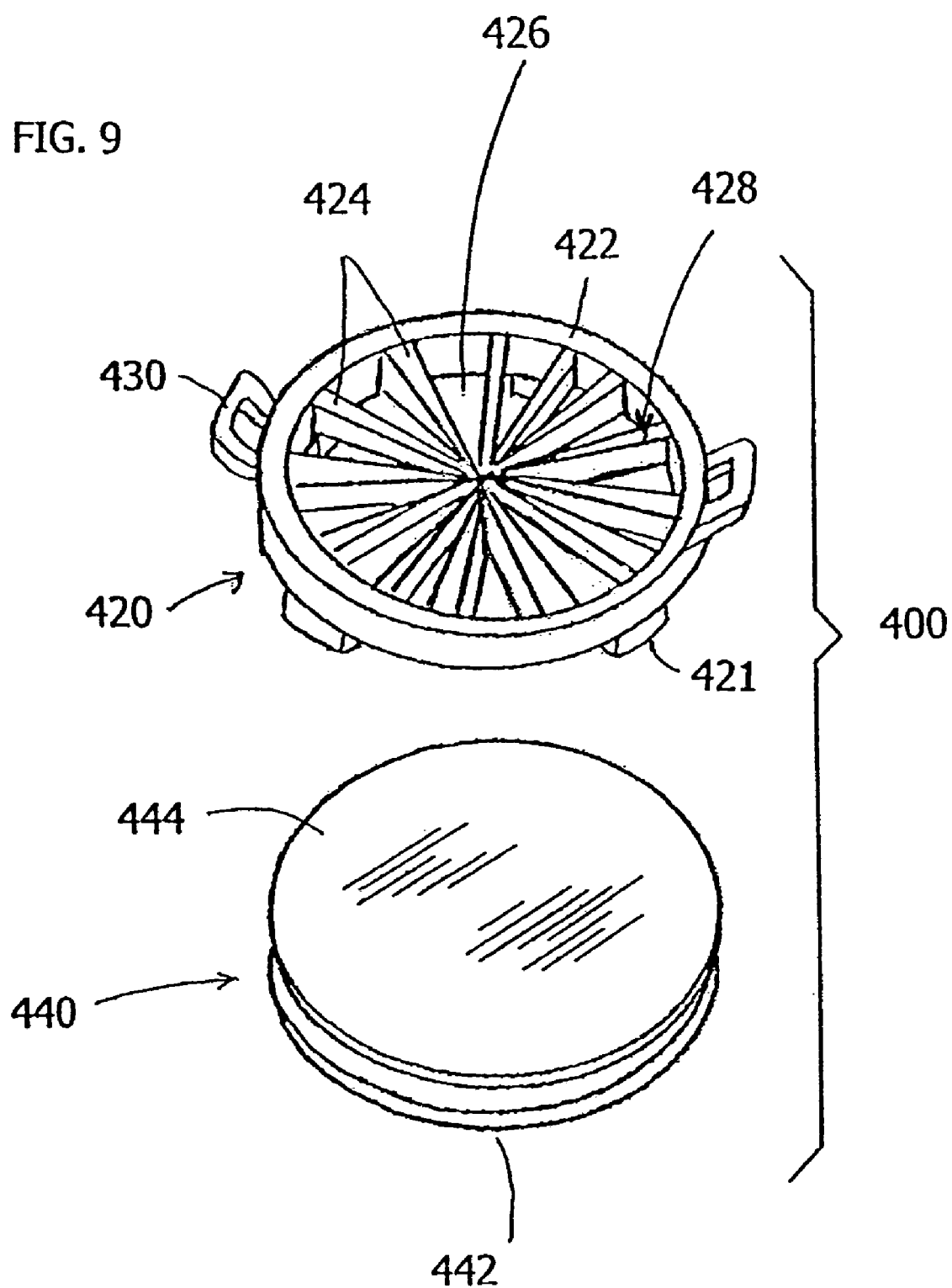
FIG. 9 is an exploded perspective view of a heat-moderating cooking kit and apparatus according to a fourth embodiment of the invention.

The food support member 420, in the embodiment of FIG. 9, is made up of a peripheral rim 422 and a plurality of spokes 424 extending inwardly toward the center of the food support member. A plurality of openings 426 are provided extending through the food support member 420 between the spokes 424. The rim 422 and attached spokes 424 cooperate to define a food support surface 428 on the top thereof.

At least two handles 430 are provided at the upper edge of the rim 422 of the food support member 420. The handles 430 extend upwardly and outwardly from the upper edge of the rim 422, to allow ease of handling of the food support member 420. In particular, the food support member 420 can be removed from the heat source using the handles 430 when cooking is completed, while the heat shield 440 can remain suspended above or near the heat source until it has cooled down.

Using the Apparatus

In use, the heat shield 440 is placed directly onto, and is supported by, a support member which is able to suspend it above the heat source. As in the first embodiment, the heat shield 440 may be placed on a grill rack within a barbeque grill.

The food support member 420 is then placed on top of the heat shield 440, such that the legs 421 are supported upon an upper surface of the heat shield 440, so that the food support member 420 overlies the heat shield 440 in a spaced-apart relationship.

Although the presently contemplated embodiments of cooking apparatus for cooking food at a moderate heat above an intense heat source have been described herein, the foregoing description is intended to illustrate, rather than to limit the invention. Those skilled in the art will recognize that various substitutions and modifications can be made, without departing from the invention. All such modifications, which are within the scope of the appended claims, are intended to be within the scope and spirit of the present invention.

What is claimed is:

1. A kit of components for use in cooking food over an intense heat source, said kit comprising:
   a heat shield member comprising a first baffle plate and a second baffle plate attached to and spaced apart from the first baffle plate, said first and second baffle plates of the heat shield member being fixedly connected by at least one spacer extending therebetween, wherein a buffer zone is defined between the baffle plates, and wherein an open space is provided between peripheral edge portions of said baffle plates, at an outer edge of said heat shield member, such that heated air from said buffer zone may flow outwardly through said open space;
   a food support member for suspended placement above the heat shield member, the food support member having a plurality of openings formed therein; and
   a plurality of primary spacers attached to the heat shield member or to the food support member, for spacing the food support member upwardly from the heat shield member.

2. The kit of claim 1, wherein the food support member comprises a platform comprising a generally flat food support panel having a plurality of holes formed therethrough, and a rim extending around at least part of an edge of the food support panel and extending upwardly therefrom.

3. The kit of claim 1, wherein the food support member comprises a plurality of interconnected bars which cooperate to define a food support surface.

4. The kit of claim 1, wherein the baffle plates have peripheral edges with an open space defined therebetween, and wherein the baffle plates are operatively attached to one another by a plurality of auxiliary spacers extending therebetween.

5. The kit of claim 4, wherein contact between the baffle plates is limited to that provided by the auxiliary spacers.

6. The kit of claim 1, wherein said support arms are fixedly attached to the upper baffle plate of heat shield member, and wherein the food support member is configured to rest on top of the support arms.

7. The kit of claim 6, wherein the support arms cooperate to form a cradle for nestingly supporting the food support member thereon.

8. The kit of claim 1, wherein the food support member has an upper surface which is coated with a stick-resistant material.

9. The kit of claim 1, wherein the food support member comprises two handles affixed to opposite sides thereof.

10. An apparatus for cooking food above an intense heat source, comprising:
    a heat shield member comprising a first baffle plate and a second baffle plate attached to and spaced apart from the first baffle plate, said first and second baffle plates of the heat shield member being fixedly connected by at least one spacer extending therebetween, wherein a buffer zone is defined between the baffle plates, and wherein an open space is provided between peripheral edge portions of said baffle plates at an outer edge of said heat shield member such that heated air from said buffer zone may flow outwardly through said open space;

a food support member for suspended placement above the heat shield member, the food support member having a plurality of openings formed therein; and a plurality of support arms rigidly affixed to said heat shield member, said support arms extending between and interconnecting the food support member and the heat shield member.

11. A cooking apparatus for cooking above a relatively intense heat source, the cooking apparatus comprising:

a heat shield which is adapted for placement above the heat source, said heat shield comprising an upper plate and a lower plate, the upper plate fixed to the lower plate in a vertically stacked, spaced-apart relationship, said upper and lower plates of the heat shield being fixedly connected by at least one spacer extending therebetween, wherein a buffer zone is defined between said upper and lower plates, and wherein an open space is provided between peripheral edge portions of said plates, at an outer edge of said heat shield, such that heated air from said buffer zone may flow outwardly through said open space and a food support member adapted to be placed above and spaced apart from the heat shield, wherein the food support member comprises a planar base with a peripheral edge, and a rim attached to and surrounding the peripheral edge of the base, the rim extending upwardly and outwardly from the peripheral edge of the base, wherein the rim is provided with at least two handles extending from an upper edge thereof, and wherein the planar base has a plurality of perforations extending therethrough between upper and lower surfaces thereof, to allow the passage of air and heat therethrough.

12. The cooking apparatus of claim 11, wherein the lower surface of the base is supported by an upper surface of the heat shield.

13. The cooking apparatus of claim 11, wherein the upper surface of the heat shield is provided with a plurality of support arms extending upwardly thereon, and wherein the support arms cooperate to support the food support member therebetween, so that the food support member overlies the heat shield in a spaced-apart relationship.

14. The cooking apparatus of claim 13, wherein the upper surface of the upper plate is provided with at least three upwardly extending support arms, the at least three upwardly extending support arms being positioned equidistantly on the upper surface adjacent the peripheral edge of the upper plate, the under side of the base being removably supported by the at least three upwardly extending supports so that the food support member overlies the heat shield in a spaced-apart relationship.

15. The cooking apparatus of claim 14, wherein the at least three upwardly extending support arms comprise substantially U-shaped members, wherein each of the substantially U-shaped members comprises a first leg portion, a closed-end portion, and a second leg portion, wherein the first leg portion is fixed to the upper surface of the upper plate, the closed-end portion extends normally upward from the upper surface of the upper plate, and the second leg portion confronts and abuts the underside of the plate.

16. The cooking apparatus of claim 15 wherein a first distance is defined between the upper plate and the lower plate of the heat shield, wherein a second distance is defined between the heat shield and the food support member, and wherein the first distance is less than half of the second distance.

17. A method of using a cooking apparatus to cook food over a barbeque grill, wherein the cooking apparatus comprises a heat shield having a plurality of spacers affixed to an upper surface thereof the and extending upwardly thereon, and a food support member adapted for placement above and spaced apart from the heat shield, said method comprising the steps of:

a) placing the heat shield on a grill rack of the barbeque grill, wherein the heat shield comprises an upper plate and a lower plate, the upper plate fixed to the lower plate in a vertically stacked, spaced-apart relationship, said upper and lower plates of the heat shield being fixedly connected by at least one spacer extending therebetween, wherein a buffer zone is defined between said upper and lower plates, and wherein an open space is provided between peripheral edge portions of said plates, at an outer edge of said heat shield, such that heated air from said buffer zone may flow outwardly through said open space;

b) placing uncooked food on top of a food support surface of the food support member;

c) placing the food support member on top of the spacers of the heat shield such that the food support member is supported thereby;

d) allowing the food is to cook on the food support member; and e) removing the food from the food support member.

* * * * *

UNITED STATES PATENT AND TRADEMARK OFFICE
CERTIFICATE OF CORRECTION

| | |
|---|---|
| PATENT NO. | : 7,219,663 B2 |
| APPLICATION NO. | : 10/932663 |
| DATED | : May 22, 2007 |
| INVENTOR(S) | : Cuomo |

It is certified that error appears in the above-identified patent and that said Letters Patent is hereby corrected as shown below:

Title page:
    Change "Item (75) Inventor: Robert Cuomo, Oconomowoc, WI (US)" to --(75) Inventor: Robert Cuomo, Wales, WI (US)-- to be in agreement with the inventor-signed Declaration.
    On the Title Page "(57) ABSTRACT", line 3, change "grill or 1." to --grill or campfire. --.

Column 2:
    Line 2, change "with the grills'" to --with the grill's--.
    Line 7, change "4,498,276" to --4,498,376--.

Column 3:
    Line 19, change "domed lit" to --domed lid--.
    Line 20, change "is 1 within" to --is achieved within--.

Column 6:
    Line 37, change "directly on a 1" to --directly on a surface--.

Column 7:
    Line 47, change "for extending periods" to --for extended periods--.

Column 8:
    Line 54, change "the appratus" to --the apparatus--.

Column 10:
    Line 39, change "extending ther-" to --extending there- --.
    Line 40, change "ebetween." to --between. --.
    Line 44, change "of heat shield" to --of the heat shield--.

Column 11:
    Line 21, change "said open space and" to --said open space; and--.

Column 12:
    Line 24, change "thereof the and" to --thereof and--.

UNITED STATES PATENT AND TRADEMARK OFFICE
CERTIFICATE OF CORRECTION

| | |
|---|---|
| PATENT NO. | : 7,219,663 B2 |
| APPLICATION NO. | : 10/932663 |
| DATED | : May 22, 2007 |
| INVENTOR(S) | : Cuomo |

It is certified that error appears in the above-identified patent and that said Letters Patent is hereby corrected as shown below:

Column 12:
    Line 46, change "food is to cook" to --food to cook--.

Signed and Sealed this

Twenty-third Day of October, 2007

JON W. DUDAS
*Director of the United States Patent and Trademark Office*